United States Patent
Souriall

(10) Patent No.: US 8,376,861 B2
(45) Date of Patent: Feb. 19, 2013

(54) SYSTEM AND METHOD FOR INTER-CONNECTABLE MULTI-TRACK MEDIA-BASED TRADING CARDS

(75) Inventor: Robert Thomas Souriall, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1156 days.

(21) Appl. No.: 12/288,551

(22) Filed: Oct. 20, 2008

(65) Prior Publication Data

US 2010/0097911 A1    Apr. 22, 2010

(51) Int. Cl.
*A63F 9/24* (2006.01)

(52) U.S. Cl. ........ 463/43; 463/1; 463/41; 446/172; 446/484; 273/237; 273/293; 273/308

(58) Field of Classification Search .......... 446/175, 446/484; 463/1, 40, 41–42; 273/308, 454; 369/63–64
See application file for complete search history.

(56) References Cited

U.S. PATENT DOCUMENTS

| | | | | |
|---|---|---|---|---|
| 5,433,035 A * | 7/1995 | Bauer | | 40/124.03 |
| 5,480,156 A * | 1/1996 | Doederlein et al. | | 273/237 |
| 5,588,678 A * | 12/1996 | Young | | 704/272 |
| 5,641,164 A * | 6/1997 | Doederlein et al. | | 273/237 |
| 5,743,801 A * | 4/1998 | Welander | | 463/44 |
| 5,768,223 A * | 6/1998 | Li et al. | | 434/311 |
| 5,841,878 A * | 11/1998 | Arnold et al. | | 381/124 |
| 5,959,281 A * | 9/1999 | Domiteaux | | 235/454 |
| 6,282,819 B1 * | 9/2001 | Gu | | 40/124.03 |
| 6,292,780 B1 * | 9/2001 | Doederlein et al. | | 704/270 |
| 6,680,715 B2 * | 1/2004 | Blotky et al. | | 345/1.3 |
| 8,057,306 B2 * | 11/2011 | Glassman et al. | | 463/42 |
| 2002/0198032 A1 * | 12/2002 | Sitrick et al. | | 463/1 |
| 2003/0140535 A1 * | 7/2003 | Knoerzer et al. | | 40/544 |

OTHER PUBLICATIONS

*EDIBAS product: High School Musical length:20*, DiaFramma Advertising (Oct. 2008).
*Simpsons Hit Clips*, Simpsons Collector Sector—Tiger Electronics a division of Hasbro, Inc., p. 1-3 (2002).
*Hit Clips Micro Music System Earbud Player Instructions*, Tiger Electronics a division of Hasbro, Inc. (2002).
"Edibas Collections—Collezioni Edibas." Edibas Collections BV. Dec. 31, 2008 <http://www.edibas.com/it/dettagliocollezione.plp?idCollezione=205>.

* cited by examiner

*Primary Examiner* — Dmitry Suhol
*Assistant Examiner* — Alex F. R. P. Rada, II
(74) *Attorney, Agent, or Firm* — Farjami & Farjami LLP

(57) ABSTRACT

There are provided systems and methods for inter-connectable multi-track media-based cards. There is provided a card for media playback, the card comprising a media output, a memory storing at least one of a plurality of media tracks of a media, a communications interface inter-connectable with one or more additional cards storing other media tracks of the plurality of media tracks of the media, and a media processor. The media processor is configured to detect, via the communications interface, any of the one or more additional cards connected to the communications interface to determine connected cards, and cause a playback of at least one of the plurality of media tracks in the memory in combination with at least one of the other media tracks of the plurality of media tracks on the connected cards. This enables concurrent playback of multi-track media-based trading cards, providing entertainment and collectible value for users.

20 Claims, 4 Drawing Sheets

US 8,376,861 B2

SYSTEM AND METHOD FOR INTER-CONNECTABLE MULTI-TRACK MEDIA-BASED TRADING CARDS

BACKGROUND OF THE INVENTION

1. Field of the Invention

The present invention relates generally to collectible and trading cards. More particularly, the present invention relates to media-based collectible and trading cards.

2. Background Art

Trading cards can be purchased almost anywhere, not just at specialized card and collectible storefronts but also at more mundane locations such as supermarket checkout counters and newspaper stands. Their ubiquitous presence and easy accessibility are testaments to their enduring appeal. For over a century, the trading card has not changed very much in basic functionality, often providing a picture of a person or a thing and including some descriptive written material, such as statistics or trivia, on a thin piece of cardboard or paper. Although recently developed trading card systems offering competitive gaming features such as "Magic the Gathering" and "Yu-Gi-Oh" have enjoyed widespread popularity, they still rely on the traditional trading card paradigm with no novel technology.

Another product with a firmly established commercial presence is the audio compact disc, which is still in use more than two decades since its introduction. However, recent sales of music on physical media such as audio compact discs have stagnated as users demand better value propositions for their dollars. Consumers are seeking new, exciting ways of experiencing their favorite artists and performers, and discs with digital music tracks are no longer attracting the same attention they once did in the past. In today's highly networked and technology conscious society, people take pride in having the latest and greatest technology amongst their peers. Both vanilla trading cards and traditional media records fail to address the modern computerized and networked lifestyles.

Accordingly, there is a need to overcome the drawbacks and deficiencies in the art by providing a new wave of cards, such as trading cards with value-added functionality that enable users to satisfy their entertainment and modern lifestyle needs.

SUMMARY OF THE INVENTION

There are provided systems and methods for inter-connectable multi-track media-based cards, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for inter-connectable multi-track media-based trading cards. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
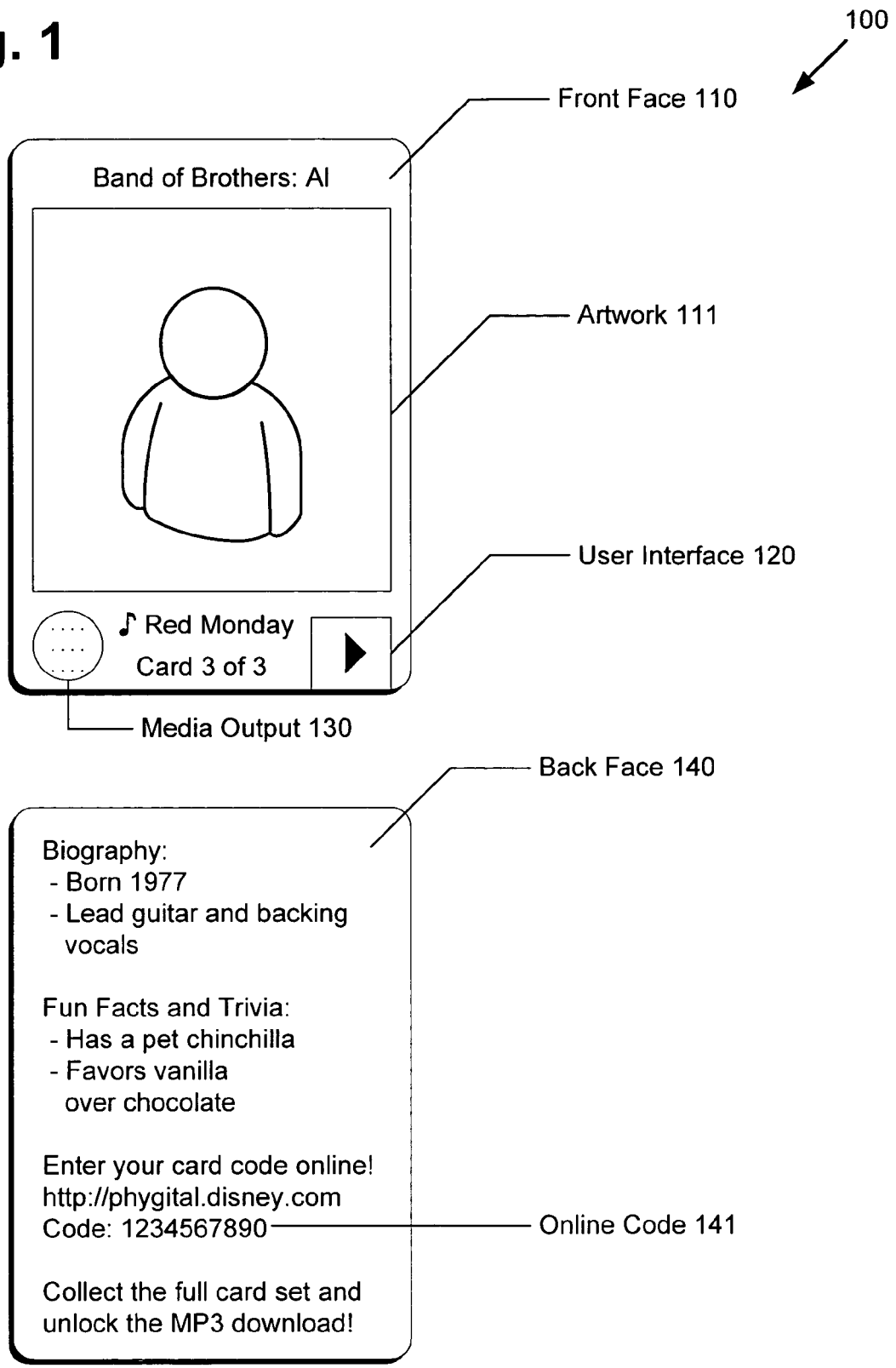
FIG. 1 presents a depiction of the front and back faces of an inter-connectable media-based trading card, according to one embodiment of the present invention.

FIG. 1 presents a depiction of the front and back faces of an inter-connectable media-based trading card, according to one embodiment of the present invention. Media-based trading card 100 includes front face 110 and back face 140. Front face 110 includes artwork 111, user interface 120, and media output 130. Back face 140 includes online code 141. Front face 110 and back face 140 form opposing sides, and may comprise printed graphics on paper or some other suitable material, with a transparent covering or coating such as plastic providing protection for the printed material and internal components.

Figure 2:
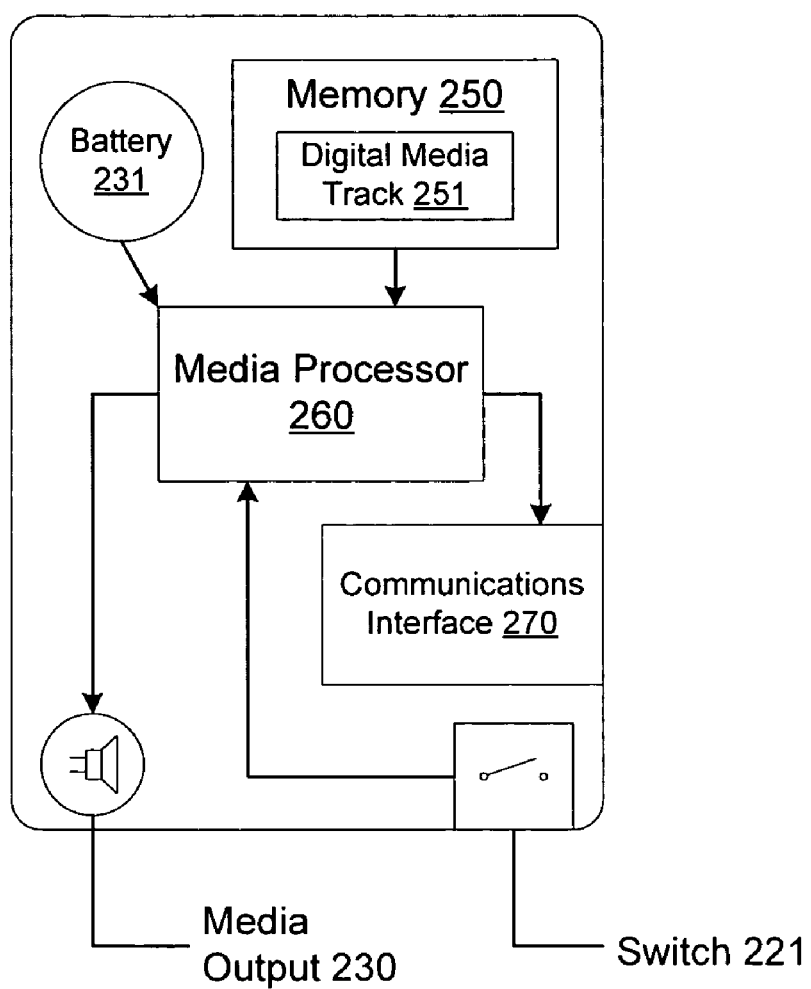
FIG. 2 presents a block diagram of the internal components comprising an inter-connectable media-based trading card, according to one embodiment of the present invention.

Media-based trading card 100 may be dimensioned in the standard 2.5 inch by 3.5 inch trading card size or any other arbitrary form factor large enough to house the internal components shown in FIG. 2. Although music trading card 100 is depicted as a rounded rectangle in the portrait orientation, music trading card 100 could also form orthogonal corners, an arbitrary non-rectangular shape, or a landscape orientation. Although thickness can also be arbitrarily selected, it may be preferable to dimension music trading card 100 as thin as possible, one eighth (⅛) of an inch or thinner. A form factor that closely resembles a traditional paper-thin trading card may encourage higher acceptance rates and adoption among retailers and users.

Front face 110 includes card identification information printed along the top and the bottom, including the name of the performer, "Al" of the "Band of Brothers" performing group, the song associated with the card, "Red Monday," and the number of the card within a set, "Card 3 of 3." Artwork 111 provides a visual depiction of the performer. These elements might be shared with a traditional trading card, but media-based trading card 100 also includes a few extra elements to support media playback, including user interface 120 and media output 130. User interface 120 takes the form of a depressible button in FIG. 1, allowing a user to initiate media playback through media output 130. Although user interface 120 is flush with the surface of front face 110, alternative embodiments may position user interface 120 on back face 140, or along an edge of the card rather than the front or back faces. Although user interface 120 does not necessarily need to be flush with a surface, it may be preferable to keep a flat surface, to avoid accidental triggering, and to facilitate easy card stacking. Additionally, a number of other user interfaces could substitute for user interface 120, such as a thermal sensor reacting to body heat, a sound detector reacting to a sharp noise such as a clap, or a movement sensor detecting a shaking of the card.

Although media output 130 is depicted as a single monaural audio speaker in FIG. 1, alternative embodiments might include multiple media outputs. For example, multiple speakers might support stereo or multi-channel audio, whereas display screens for video such as LCD screens, electronic paper, and other display technologies might support video playback. However, form factor size constraints, battery power limitations, and cost reduction considerations may render a single monaural speaker a practical compromise for optimal media playback in a cost effective form factor. For higher quality audio output, media output 130 might be located external to the card itself, in which case there may be a docking station or external sound system that handles audio output. Prior to media output 130 outputting any audio signal, any incoming audio in digital format will need to undergo digital-to-analog signal conversion, which might be provided by an audio processor embedded within media-based trading card 100.

Back face 140 includes various biographical and trivia information concerning the performer identified on front face 110, and also provides an online dimension to the card via online code 141. This might be a sequence of numbers that is unique for each particular card, valid for a single online redemption. For example, if a user collects every card in a particular set of cards, and enters each respective online code 141 onto a website, "http://phygital.disney.com" in FIG. 1, then various features could be unlocked for the user. For example, if all three cards in the "Red Monday" set are redeemed, a downloadable MP3 version of the song "Red Monday" could be unlocked for playback on the user's computer and portable media player. Additionally, a virtual card collection might keep track of the cards the user has redeemed and display them in a virtual collection room, showing completed sets and identifying missing cards. There may be an option to allow the public to view the collection, giving the user an opportunity to showcase her collection to her fellow peers. These additional online components might encourage users to continue collecting and trading cards so they can complete their sets and compare virtual collections online.

FIG. 2 presents a block diagram of the internal components comprising an inter-connectable media-based trading card, according to one embodiment of the present invention. Media-based trading card 200 includes switch 221, media output 230, battery 231, memory 250, media processor 260, and communications interface 270. Memory 250 stores digital media track 251. Switch 221 is coupled to user interface 120 from FIG. 1. Media output 230 corresponds to media output 130 from FIG. 1. The components shown in FIG. 2 are hidden underneath front face 110 of FIG. 1.

FIG. 2 shows the internal components that allow user interface 120 from FIG. 1 to initiate media playback through media output 230. When user interface 120 from FIG. 1 is depressed, corresponding switch 221 is triggered underneath, informing media processor 260 that a user has requested playback. Additionally, communications interface 270 may direct concurrent playback of other detected media-based trading cards belonging to the same set as media-based trading card 200 of FIG. 2.

Battery 231 provides a power supply for the internal components of FIG. 2, allowing media output 230 to amplify an audio signal, media processor 260 to process audio signals and carry out logic, and communications interface 270 to power a physical link or wireless antenna. Furthermore, battery 231 might be rechargeable, for example by connecting an external power supply or by integrating a solar panel or some other means of collecting energy. Battery 231 might also be user replaceable, using a standardized battery size such as a commonly available watch battery.

Memory 250 provides storage space for one or more stored digital media tracks, including digital media track 251, and may also contain metadata concerning the associated media-based trading card, such as a card identifier and set membership details. When particular cards store coherent media tracks of a multi-track media whole, they can belong to the same set, which may be noted within the set membership details. There are a number of different ways memory 250 could be configured, depending on how concurrent playback may be supported. One configuration would be to store only the digital media track associated with media-based trading card 200 as digital media track 251. If this method is used, then concurrent playback can be initiated by using other media-based trading cards in the same set to playback the respective digital media tracks through the respective media outputs concurrently. Alternatively, media processor 260 could retrieve the respective digital media tracks using communications interface 270 and digitally mix the tracks on the fly, generating a combined digital media track stored in memory 250 for digital-to-analog conversion and playback through media output 230. If playback through all media outputs is desirable, then the combined digital media track could be distributed via communications interface 270 for playback through each respective media output.

Alternatively, memory 250 could store a plurality of previously mixed digital media tracks containing all possible combinations of digital mixes represented by a set of media-based trading cards. This configuration may be desirable where communications interface 270 or media processor 260 has insufficient computational resources or bandwidth to support on the fly digital mixing, and playback of tracks through separate media outputs is undesirable. For example, if the media-based trading cards are stacked on top of each other, only the media output from the top-most card will be suitable to output clear audio, as the stacked cards below would have their media outputs blocked and muffled.

To implement the above pre-mixed configuration, media processor 260 selects an appropriate pre-mixed digital media track from memory 250 after detecting all media-based trading cards belonging to the same set as media-based trading card 200. Thus, the computationally intensive step of mixing digital media tracks on the fly is avoided. However, since every possible combination needs to be pre-generated, more storage space may be needed in memory 250, particularly if there is a large set resulting in many combinations. Thus, this method may only be practical with small sets containing few members, and/or with the assistance of media compression to reduce storage requirements.

It should be noted that although each card may be referenced as having a single "digital media track," it might nevertheless include multiple "tracks" as commonly understood in the audio recording and mastering industry. A master recording of a song might include hundreds of "tracks" for individual instruments, for individual elements of polyphonic vocals, and for mixing effects and other mastering duties. Having a separate media-based trading card for each "track" may be unwieldy, so these tracks might be mixed down into composite digital media tracks comprising multiple tracks. Thus, for example, the digital media track associated with media-based trading card 100 of FIG. 1 might include several concurrent vocal tracks for polyphonic harmony, and several lead guitar tracks with supplemental effects tracks, all mixed down into a single digital media track. Thus, although media-based trading card 100 might only store a single digital media track, it may still comprise multiple "tracks" that are mixed down into a single track.

Furthermore, it should be noted that, in other embodiments, each card is not limited to only a single media track. Although some examples depict only a single media track for simplicity purposes, alternative embodiments may include multiple media tracks. For example, user interface 120 could be configured such that multiple presses of a button cycles between different media tracks. These different media tracks might allow the user to select remixed variations of the same media, or different time ranges of the same media. A card having selectable remixes of a song might store a radio edit version, a dance remix version, and an acoustic version. A card having selectable time ranges might focus on the bridge, verse, and solo sections of a song. Moreover, a card is not necessarily limited to featuring a single individual or thing. For example, media-based trading card 100 could feature an entire band, with user interface 120 cycling through the vocals of each performer. Communications interface 270 provides the connection to other media-based trading cards, allowing detection of nearby media-based trading cards belonging to the same set as media-based trading card 200 and transfer of data, such as digital media tracks or instructions for initiating concurrent playback. Metadata retrieved from memory 250 might assist communications interface 270 in identifying cards belonging to the same set and ignoring cards belonging to other sets. Communications interface 270 could comprise a physical connector of contacts, whereby media-based trading cards physically connect to each other by their edges or stacked on top of each other. Alternatively, communications interface 270 could comprise a wireless communications interface, such as an infrared transmitter and receiver, a Bluetooth protocol interface, or some other wireless interface. Communications interface 270 might also interface with other devices besides other media-based trading cards, such as a docking station, an external speaker set, a personal computer, or a mobile phone. When communicating with an Internet accessible device, communications interface 270 might assist the user in redeeming online code 141 of FIG. 1, which might be stored in memory 250.

Figure 3A:
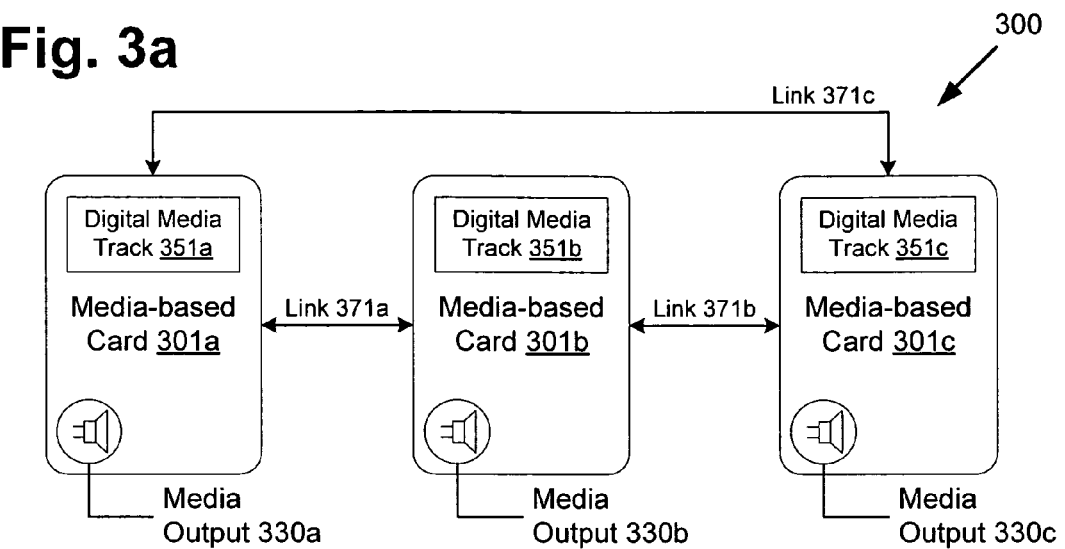
FIG. 3a and FIG. 3b present interconnected multi-track sets of inter-connectable media-based trading cards, according to one embodiment of the present invention.
Figure 3B:
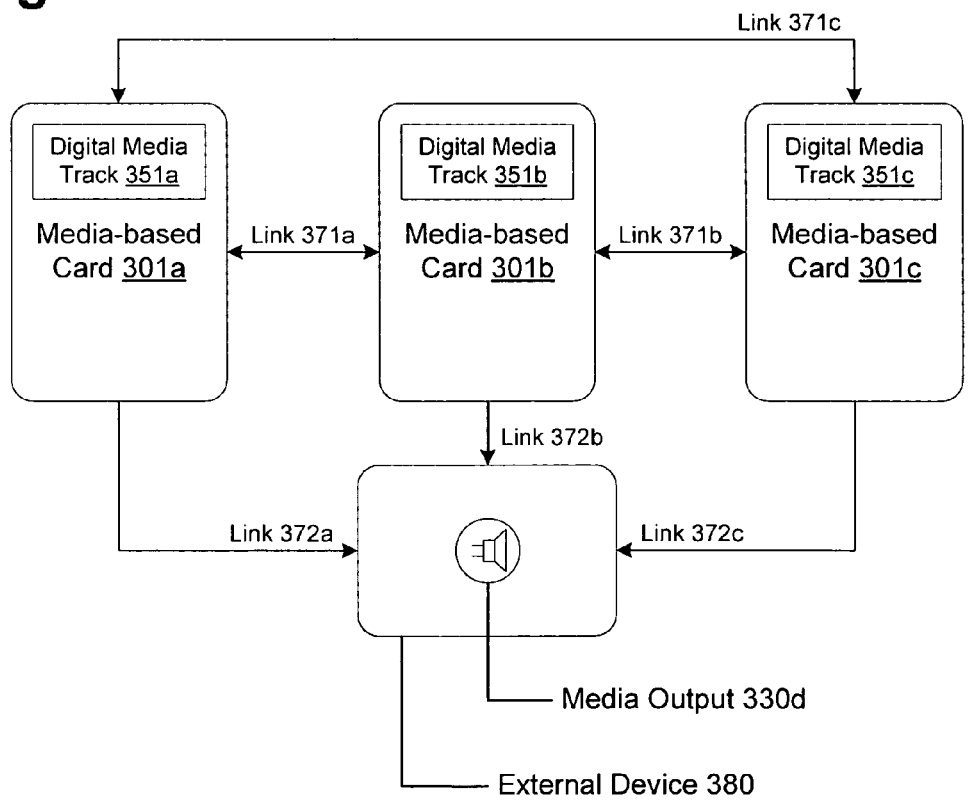

FIG. 3a and FIG. 3b present interconnected multi-track sets of inter-connectable media-based trading cards, according to one embodiment of the present invention. FIG. 3a includes media-based card 301a, media-based card 301b, and media-based card 301c. Media-based card 301a includes digital media track 351a and media output 330a. Media-based card 301b includes digital media track 351b and media output 330b. Media-based card 301c includes digital media track 351c and media output 330c. Each media-based card corresponds to media-based trading card 100 and media-based trading card 200 of FIGS. 1 and 2. However, for the sake of clarity, only the media outputs and the digital media tracks are depicted in FIG. 3a. Link 371a, link 371b, and link 371c provide data communication paths that may be utilized by communication interfaces on each media-based card. If the media-based cards connect only by direct physical connections, then link 371c may be unavailable, since link 371c may be only possible through a wireless connection if links 371a and 371b are in use.

Continuing with the Band of Brothers example of FIG. 1, media-based card 301a might represent Ian, media-based card 301b might represent Paul, and media-based card 301c might represent Al. In this case, digital media track 351a would include lead vocals and guitar performed by Ian, digital media track 351a would include lead vocals and percussion performed by Paul, and digital media track 351c would include backing vocals and lead guitar performed by Al. Although each performer is assigned to a single card in a one-to-one relationship, this is not necessarily an implied restriction. For example, there might be two cards for Al, one including strictly the backing vocals, and the other including strictly the lead guitar portion. And, as previously discussed, a card could contain multiple performers, or different variations by the same performers. For the inclusion of backing instrumentation and effects, there may be an even division amongst the three cards, or alternatively there might be a separate fourth card strictly for backing purposes.

Thus, as the user collects each card from the set depicted in FIG. 3a, each performer from the Band of Brothers is incrementally added when playback is initiated from the cards. Engaging a user interface of any of the media-based cards will cause digital media tracks 351a, 351a, and 351c in FIG. 3a to be heard concurrently, assuming each media-based card has sufficient battery power and each media-based card is within proximity such that link 371a, link 371b, and optionally link 371c are available to use. When all cards from the set in FIG. 3a are collected, the resulting combined media playback may sound similar to the fully mastered version heard on the corresponding commercial audio CD or during radio airplay.

As previously discussed, various approaches to concurrent media playback are possible. One method is to output each digital media track through each respective media output: digital media track 351a out of media output 330a, digital media track 351b out of media output 330b, and digital media track 351c out of media output 330c. This method requires each media-based card to store only one digital media track, but may result in audio quality issues due to the media tracks being played through separate physical outputs. Alternatively, the media tracks could be digitally mixed on the fly or in advance as previously discussed, and output solely through media output 330a, or concurrently through media outputs 330a, 330b, and 330c. Output through a single speaker may prevent certain audio phasing and cancellation issues that multiple outputs may cause, whereas concurrent playback may allow for a fuller soundstage than possible with a single speaker.

To conserve storage space and to encourage users to collect full card sets to unlock the full MP3 download, only a short passage of the song might be played, such as a thirty second segment of the chorus. Different sets might also exist for the same song, focusing on particular passages of interest such as solos, or variations of the same song such as remixes or a cappella versions. Special and secret cards might also exist within a set, adding guest vocalists, outtake or alternative versions, and other variations for collectors to seek. Thus, a user may assemble a custom rendition of the song passage by simply picking and choosing cards to connect together. For cards that connect physically together, this is accomplished by just physically connecting the chosen cards together. For cards that connect via wireless, this can be accomplished by placing the chosen cards in close proximity such that the wireless signal is strong enough for intercommunication. Alternatively, a toggle on the user interface may allow selective disabling of particular cards even if they are connected to each other.

FIG. 3b is similar to FIG. 3a, except that the internal outputs have been removed in favor of external device 380, providing media output 330d for audio output. Links 372a, 372b, and 372c have been added to provide data paths from the media-based trading cards to external device 380. The internal outputs have been omitted to emphasize the external speaker configuration in FIG. 3b, in contrast with the internal speaker configuration of FIG. 3a. However, this is not to imply that internal and external media output configurations are mutually exclusive, since the media-based cards of FIG. 3a might also be connectable to external device 380.

In FIG. 3b, the process of digitally mixing the digital media tracks from each media-based trading card might be offloaded to external device 380, which could represent a card docking station, a personal computer, a mobile phone, or some other device with media processing capability and connectivity to media output 330d. In this case, the functions of the media processors and the individual internal outputs can be subsumed into external device 380. On the other hand, external device 380 might only be a simple interface to media output 330d. If external device 380 is such a simple interface, the media processors embedded within the media-based trading cards may still need to process the media in advance.

Although an external media output configuration may help avoid battery drain issues and facilitate online interactivity, the additional presence of external device 380 may reduce some of the appeal of using media-based trading cards 301a, 301a, and 301c as independent, easily portable trading cards, as configured in FIG. 3a. However, as discussed above, the media-based trading cards could also function in both capacities, supporting independent operation as standalone media-based trading cards with integrated outputs, as in FIG. 3a, or dependent operation as simple storage devices for use with an external device having a connected output, as in FIG. 3b.

Figure 4:
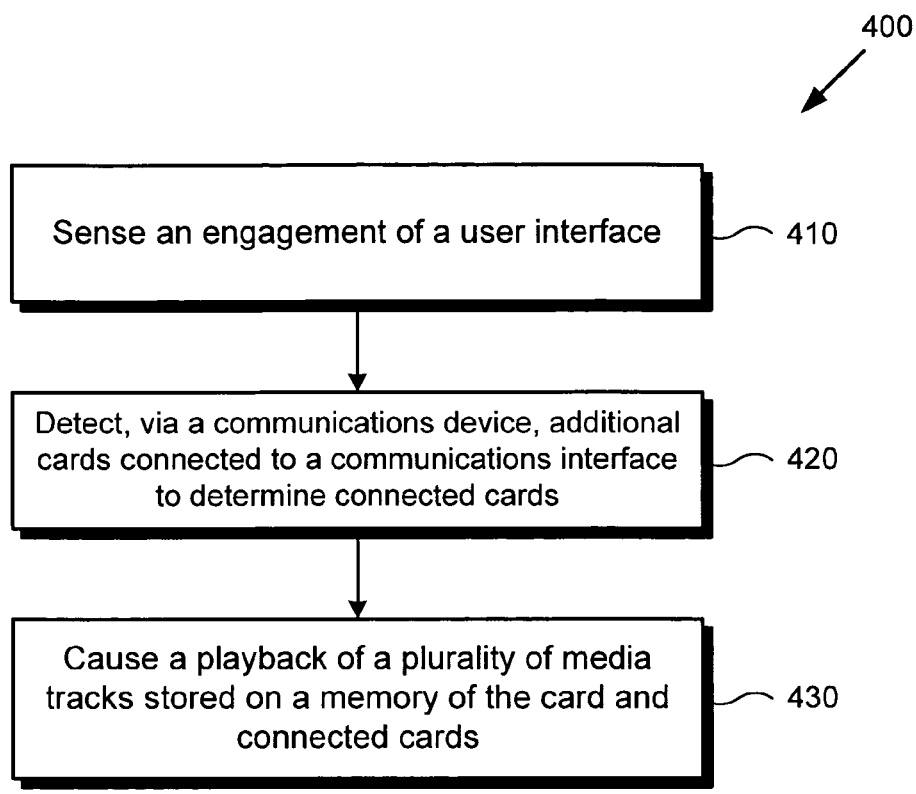
FIG. 4 shows a flowchart describing the steps, according to one embodiment of the present invention, by which an inter-connectable media-based trading card can cause a playback of a plurality of media tracks stored on a memory of the card and on connected cards.

FIG. 4 shows a flowchart describing the steps, according to one embodiment of the present invention, by which an interconnectable media-based trading card can cause a playback of a plurality of media tracks stored on a memory of the card and on connected cards. Certain details and features have been left out of flowchart 400 that are apparent to a person of ordinary skill in the art. For example, a step may comprise one or more substeps or may involve specialized equipment or materials, as known in the art. While steps 410 through 430 indicated in flowchart 400 are sufficient to describe one embodiment of the present invention, other embodiments of the invention may utilize steps different from those shown in flowchart 400.

Referring to step 410 of flowchart 400 in FIG. 4 and media-based trading card 100 of FIG. 1, step 410 of flowchart 400 comprises media-based trading card 100 sensing an engagement of user interface 120. As shown in FIG. 2, since musical trading card 200 corresponds to musical trading card 100, user interface 120 triggers switch 221, which is further connected to media processor 260, thus sensing the engagement of user interface 120. As previously mentioned, the user interface does not have to be a button in particular, and could comprise, for example, thermal, auditory, or motion sensors.

Referring to step 420 of flowchart 400 in FIG. 4 and musical trading card 200 of FIG. 2, step 420 of flowchart 400 comprises musical trading card 200 detecting, via communications interface 260, additional cards connected to communications interface 260 to determine connected cards. If, for example, musical trading card 200 corresponds to media-based card 301c of FIG. 3a, then this step would detect media-based card 301a and media-based card 301a. As previously discussed, communications interface 260 might comprise a physical connector or a wireless interface. Additionally, the card may restrict communications to other cards of the same set only, since concurrent playback of disjoint sets may result in cacophony. Cards of the same set may be determined by comparing metadata stored in memory 250 with metadata retrieved from other connected cards. If cards belonging to different sets are found, they might simply be ignored by communications interface 260.

Referring to step 430 of flowchart 400 in FIG. 4 and media-based trading card 200 of FIG. 2, step 430 of flowchart 400 comprises media-based trading card 200 causing a playback of a plurality of media tracked stored on memory 250 and cards connected by communications interface 270. Referring to FIG. 3a, if media-based trading card 200 corresponds to media-based card 351c, then digital media track 351a, digital media track 351b, and digital media track 351c will be played back concurrently.

As previously discussed, this concurrent playback can be approached in a number of different ways. Media-based card 301c can simply instruct media-based card 301a to playback digital media track 351a through media output 330b, and additionally instruct media-based card 301a to playback digital media track 351a through media output 330a, such that both playbacks are concurrent with media-based card 301c playing digital media track 351c through media output 330c. In other words, each card concurrently outputs its respective digital media track through its respective media output.

Alternatively, if pre-mixed tracks are available, then media-based card 301c may simply output the appropriate mixed track via single media output 330c. This mixed track may comprise digital media tracks 351a, 351a, and 351c digitally pre-mixed into a single track. If concurrent multiple outputs of the mixed track is furthermore desired, media-based cards 301a and 301a could be instructed to output the same mixed digital media track through their respective media outputs.

If, however, pre-mixed tracks are not available, then a media processor of one or more cards may need to mix digital media tracks 351a, 351a, and 351c on the fly, retrieving the media tracks via the available communications interfaces. Once this mix is created, it may be distributed via the communications interfaces for concurrent playback if so desired.

Alternatively, an external speaker configuration may be used, as shown in FIG. 3b. In this particular configuration, media mixing duties may be completed at external device 380, rather than at the media-based cards. Thus, the media-based cards function largely as storage devices in FIG. 3b, with external device 380 handling media manipulation, mixing, and speaker output duties.

In addition to audio applications for the media-based trading card, other embodiments of the present invention may also provide audio-visual applications. These embodiments may allow, for example, artwork 111 of FIG. 1 to represent a video display, which might playback a music video featuring the artist when user interface 120 is engaged. Thus, when an entire set of media-based cards is collected, the user can view each band member's performance in a music video or other recorded video. For example, one set of cards might focus on a particular live concert, with each card providing video footage focusing on each band member singing or playing their respective instruments. Additionally, the media is not necessarily restricted to music related content only, and any type of media that is amenable to separation into multiple tracks could be used in this card based system.

As part of the advantages of various embodiments of the present invention, users are provided a collectible trading card that provides much greater entertainment value than a traditional paper trading card. With the possibilities provided by the concurrent multi-track media playback, users are encouraged to collect, experiment with combinations, and have fun with their card collections. Virtual online rewards tied to online codes unique to each card further encourage card collection activity and improves the value proposition for the customer, particularly with unlockable downloadable content such as MP3 files. Special and limited edition cards further encourage users to showcase their collections with their peers online and offline, fostering a vibrant trading community.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A card for media playback, the card comprising:
a media output;
a memory storing at least one of a plurality of media tracks of a media;
a communications interface inter-connectable with one or more additional cards storing other media tracks of the plurality of media tracks of the media; and
a media processor configured to:
 detect, via the communications interface, any of the one or more additional cards connected to the communications interface to determine connected cards; and
 cause a playback of at least one of the plurality of media tracks in the memory in combination with at least one of the other media tracks of the plurality of media tracks on the connected cards, wherein the media processor causes the playback by:
  creating a mixed media track by combining the other media tracks with the at least one of the plurality of media tracks in the memory; and
  outputting the created mixed media track through the media output.

2. The card of claim 1, further including a user interface configured to instruct the media processor to initiate the detection and cause the playback.

3. The card of claim 2, wherein the user interface comprises a button flush with a surface of the card.

4. The card of claim 1, wherein prior to creating the mixed media track, the media processor retrieves, via the communications interface, the other media tracks from each of the connected cards.

5. The card of claim 1, wherein prior to outputting the created mixed media track through the media output, the media processor is configured to:
command, via the communications interface, each of the connected cards to output the mixed media track through each respective media output such that all media outputs operate concurrently.

6. The card of claim 1, wherein the media processor causes the playback by:
outputting the at least one of the plurality of media tracks stored in the memory through the media output; and
commanding, via the communications interface, each of the connected cards to playback at least one media track from each respective memory through each respective media output such that all media outputs operate concurrently.

7. The card of claim 1, wherein the media output includes a speaker for audio output.

8. The card of claim 1, wherein the media output includes a display for video output.

9. The card of claim 1, wherein the communications interface interconnects with other cards via a direct physical connection.

10. The card of claim 1, wherein the communications interface interconnects with other cards via a wireless connection.

11. A method for a card having a memory storing at least one of a plurality of media tracks of a media to provide media playback, the method comprising:
detecting, via a communications interface, any of one or more additional cards connected to the communications interface to determine connected cards; and
causing a playback of the at least one of the plurality of media tracks in the memory in combination with at least one of the other media tracks of the plurality of media tracks on the connected cards, wherein a media processor of the card causes the playback by:
 creating a mixed media track by combining the other media tracks with the at least one of the plurality of media tracks in the memory; and
 outputting the created mixed media track through a media output on the card.

12. The method of claim 11, wherein a media processor of the card causes the playback by:
outputting the at least one of the plurality of media tracks stored in the memory through a media output on the card; and
commanding, via the communications interface, each of the connected cards to playback at least one media track from each respective memory through each respective media output such that all media outputs operate concurrently.

13. A card for media playback, the card comprising:
a media output;
a memory storing at least one of a plurality of media tracks of a media and a plurality of mixed media tracks, the plurality of mixed media tracks including all possible combinations of mixes using the plurality of media tracks;
a communications interface inter-connectable with one or more additional cards storing other media tracks of the plurality of media tracks of the media; and
a media processor configured to:
 detect, via the communications interface, any of the one or more additional cards connected to the communications interface to determine connected cards; and
 cause a playback of at least one of the plurality of media tracks in the memory in combination with at least one of the other media tracks of the plurality of media tracks on the connected cards, wherein the playback is caused by:
  selecting a mixed media track from the memory corresponding to the connected cards; and
  outputting the selected mixed media track through the media output.

14. The card of claim 13, wherein prior to outputting the selected mixed media track through the media output, the media processor is configured to:
command, via the communications interface, each of the connected cards to output the mixed media track through each respective media output such that all media outputs operate concurrently.

15. A card for media playback, the card comprising:
a media output;

a memory storing at least one of a plurality of media tracks of a media;

a communications interface inter-connectable with one or more additional cards storing other media tracks of the plurality of media tracks of the media; and a media processor configured to:
  detect, via the communications interface, any of the one or more additional cards connected to the communications interface to determine connected cards; and
  cause a playback of at least one of the plurality of media tracks in the memory in combination with at least one of the other media tracks of the plurality of media tracks on the connected cards, wherein the media processor causes the playback by:
    outputting the at least one of the plurality of media tracks stored in the memory through the media output; and
    commanding, via the communications interface, each of the connected cards to playback at least one media track from each respective memory through each respective media output such that all media outputs operate concurrently.

16. A method for a card having a memory storing at least one of a plurality of media tracks of a media to provide media playback, the method comprising:

detecting, via a communications interface, any of one or more additional cards connected to the communications interface to determine connected cards; and causing a playback of the at least one of the plurality of media tracks in the memory in combination with at least one of the other media tracks of the plurality of media tracks on the connected cards, wherein a media processor of the card causes the playback by:
  selecting a mixed media track from the memory, the mixed media track corresponding to the connected cards, wherein the memory further stores a plurality of mixed media tracks, the plurality of mixed media tracks including all possible combinations of mixes using the plurality of media tracks; and
  outputting the selected mixed media track through a media output on the card.

17. A method for a card having a memory storing at least one of a plurality of media tracks of a media to provide media playback, the method comprising:

detecting, via a communications interface, any of one or more additional cards connected to the communications interface to determine connected cards; and causing a playback of the at least one of the plurality of media tracks in the memory in combination with at least one of the other media tracks of the plurality of media tracks on the connected cards, wherein a media processor of the card causes the playback by:
  outputting the at least one of the plurality of media tracks stored in the memory through a media output on the card; and
  commanding, via the communications interface, each of the connected cards to playback at least one media track from each respective memory through each respective media output such that all media outputs operate concurrently.

18. A card for media playback through an external device, the card comprising:

a memory storing at least one of a plurality of media tracks of a media;

a communications interface connectable with the external device to output the at least one of the plurality of media tracks through a media output on the external device; and a media processor configured to:
  detect, via the communications interface, any of one or more additional cards connected to the communications interface to determine connected cards; and
  cause a playback of at least one of the plurality of media tracks in the memory in combination with at least one of the other media tracks of the plurality of media tracks on the connected cards, wherein the media processor causes the playback by:
    creating a mixed media track by combining the other media tracks with the at least one of the plurality of media tracks in the memory; and
    outputting the created mixed media track through the media output.

19. The card of claim 18, wherein the media output on the external device includes a speaker for audio output.

20. The card of claim 18, wherein the media output on the external device includes a display for video output.

* * * * *